US00RE37669E

(19) United States
(12) Reissued Patent
Kawano

(10) Patent Number: US RE37,669 E
(45) Date of Reissued Patent: Apr. 23, 2002

(54) METHOD AND APPARATUS FOR HAND-OFF OF CALL IN PROGRESS

(75) Inventor: Minori Kawano, Amagasaki (JP)

(73) Assignee: Mitsubishi Denki Kabushiki Kaisha, Tokyo (JP)

(21) Appl. No.: 08/154,250

(22) Filed: Nov. 18, 1993

Related U.S. Patent Documents

Reissue of:
(64) Patent No.: 5,067,171
Issued: Nov. 19, 1991
Appl. No.: 07/167,634
Filed: Mar. 11, 1988

(30) Foreign Application Priority Data

Mar. 31, 1987 (JP) ..... 62-79942

(51) Int. Cl.[7] ..... H04Q 7/22
(52) U.S. Cl. ..... 455/436; 455/525
(58) Field of Search ..... 455/33.2, 33.3, 455/33.4, 52.1, 52.2, 52.3, 56.1, 54.1, 54.2, 226, 1, 23, 436, 437, 438, 439, 442, 443, 525, 513; 379/59, 60, 63

(56) References Cited

U.S. PATENT DOCUMENTS 4,485,486 A * 11/1984 Webb et al. ..... 455/438 X
4,531,235 A * 7/1985 Brusen ..... 455/226.2 X
4,619,002 A * 10/1986 Thro ..... 455/226.2
4,704,734 A * 11/1987 Menich et al. ..... 455/436 X
4,718,081 A * 1/1988 Brenig ..... 455/438
4,751,725 A * 6/1988 Bonta et al. ..... 455/438 X
4,759,051 A * 7/1988 Han ..... 455/436 X

OTHER PUBLICATIONS

"Cellular Handoff Procedure", Oct. 1984 by Astronet Corp.*
"Handoff Procedure in Nordic NMT System", published Mar. 3, 1983.*
Astronet Corp. "Cellular Handoff Procedure", Engineering Bulletin 011, Oct. 1984.*
Nordic Systems, "Handoff Procedure in Nordic NMT System", Mar. 1983.*

* cited by examiner

*Primary Examiner*—Fan Tsang
*Assistant Examiner*—Philip J. Sobutka
(74) *Attorney, Agent, or Firm*—Pennie & Edmonds LLP

(57) ABSTRACT

A method and apparatus for a hand-off of a call-in-progress according to the present invention is arranged such that both a first ratio of a length of time, in which a measured value of SNR is below a predetermined "threshold" to a total length of the measuring time, and a second ratio of a length of time, in which a measured value of RSSI is below a predetermined "threshold", to a total length of the measuring time are detected and that the first ratio functions mainly when the "threshold" of RSSI is predetermined to a relatively low value; and the second ratio functions mainly when the "threshold" of RSSI is predetermined to a relatively high value, thereby optimizing the hand-off timing.

79 Claims, 5 Drawing Sheets

START
S1
IS THRESHOLD OF RSSI HIGH OR LOW ?
HIGH
LOW
S6
DETECT RSSI
S2
DETECT SNR
S7
DETECTED RSSI < THRESHOLD ?
<
"OFF"
S3
IS OUTPUT OF COMPARATOR "ON" OR "OFF" ?
S8
≧
PROCESSING OF NEXT TASK
S4
SHIFT t-COUNTER 1 BIT
"ON"
PROCESSING OF NEXT TASK
S5
S9
T1 ELAPSED ?
YES
S10
DELETE DATA OF LAST DETECTION
NO
S11
TOTAL t ≧ t1
t ≧ t1
S12
ISSUE A HAND-OFF REQUEST
t < t1
S13
PROCESSING OF NEXT TASK

METHOD AND APPARATUS FOR HAND-OFF OF CALL IN PROGRESS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is generally related to a small-cell mobile radio communication system such as a cellular mobile telephone system and particularly related to a method and apparatus for determining timing of a hand-off for permitting a mobile station to continue a telephone call while the mobile station is roaming across different small cells.

2. Description of the Related Art

Already-utilized prior art systems of determining timing of a hand-off are classified into the following two types:

(1) A first type of the prior art system is the system that the hand-off timing is determined on the basis of a ratio of a length of time in which a detected value of a signal-to-noise ratio (hereinunder abbreviated as an SNR) is below a predetermined threshold to the total length of time of detecting or measuring the SNR; and (2) Another type of the prior art system is the system that the hand-off timing is determined on the basis of a ratio of a length of time in which a detected value of received signal strength input (hereinunder abbreviated as an RSSI) is below a predetermined threshold value to the total time of measuring the RSSI. A typical system of the first type (hereunder referred to simply as an SNR system) is the NORDIC mobile telephone system and further that of the second type (hereunder referred to simply as an RSSI system) is the small-cell mobile telephone system developed in the United States of America (hereunder referred to simply as the U.S. cellular system).

Turning now attention to FIG. 5, there is illustrated a block diagram of a conventional hand-off timing detecting system proposed by, for example, ASTRONET CORPORATION in the United States of America. In this figure, the reference numeral 1 designates a receiving antenna; 2 a high frequency amplifier; 3 a first mixer; 4 a first station-originating signal oscillator; 5 a first intermediate-frequency filter; 6 a second station-originating signal oscillator/second mixer; 7 a second intermediate-frequency filter; 8 a second intermediate-frequency amplifier/discriminator; 9 a noise detector; 10 an SAT signal detector; 11 a comparator; 12 a logical circuit/controller; and 13 an output terminal.

Next, an operation of this system will be explained hereinbelow. High-frequency signals received by the receiving antenna 1 are amplified by the high-frequency amplifier 2. Then, the amplified signals from the amplifier 2 are combined with signals from the oscillator 4 by the first mixer 3 to produce first intermediate-frequency signals. Desired waves are selected from the thus obtained first intermediate-frequency signals by use of the band filter 5 and are converted into second intermediate-frequency signals by the second station-originating signal oscillator/second mixer 6. The second intermediate-frequency signals undergo selecting process in the band filter 7. Further, the thus selected signals are converted into voice signals by the intermediate-frequency amplifier/discriminator 8 and then the voice signals are fed to an SNR detecting circuit which is composed of the noise detector 9, the SAT signal detector 10 and the comparator 11. The voice signals contain supervisory audio tone (hereunder abbreviated as SAT) signals in addition to ordinary signals representing voices. The SAT signals are used to monitor circuits, and three frequencies of waves (namely, waves of 5970 Hz, 6000 Hz and 6030 Hz) are used as the SAT signals in the U.S. cellular system. The SAT signal is detected by the signal detecting circuit 10. On the other hand, noises, of which frequencies are close to the frequency of the SAT signal, are detected by the noise detector 9. Thereafter, an SNR is evaluated by comparing a voltage level S of the detected signal to a voltage level N of the noise in the comparator 11. An output of the comparator 11 is at a level indicating "on" state thereof (hereunder referred to simply as "on" level" when the evaluated value of the SNR exceeds or equals a predetermined threshold (for instance, 20 dB), whereas the output thereof is at another level indicating "off" state thereof (hereunder referred to simply as "off" level) when being below the threshold. The logical circuit/controller 12 detects a ratio of a length of time, in which the output of the comparator 11 is at the "off" level, to the total time of the measurement of an SNR. If the detected rate exceeds the threshold, the logical circuit/controller 12 sends out a hand-off request by putting the output terminal 13 at a level indicating "ON" status of the SNR detecting circuit (hereunder referred to simply as "ON" status level).

On the other hand, the RSSI system employs an RSSI detecting circuit which substitutes for the above described SNR detected circuit 9, 10 and 11. Further, in the RSSI detecting circuit by using the similar procedures as in the SNR detecting circuit.

As described above, each prior art system of detecting timing of a hand-off employs either the SNR system or the RSSI system. Comparison between these SNR and RSSI systems reveals the following fact. First, in case that adjacent two small-cells or zones are arranged to overlap with each other slightly or in part, the SNR system surpasses the RSSI system at performance of appropriately detecting timing of a hand-off because the SNR can detect disturbances caused by interference or the like. However, in case that the adjacent two zones overlap with each other in large part, the RSSI system surpasses the SNR system because the RSSI system can detect high RSSI. In spite of this fact there is provided no system which is capable of optimizing the timing of a hand-off in accordance with every type of zone arrangement. The present invention is made to obviate the above-described problems of the prior art.

SUMMARY OF THE INVENTION

Accordingly, it is a primary object of the present invention to provide a method and apparatus for a hand-off of a call-in-progress which being capable of optimizing the timing of a hand-off by virtue of a combination of the SNR system and the RSSI system.

A method and apparatus for a hand-off of a call-in-progress according to the present invention is arranged such that both a ratio (hereunder referred to simply as a first ratio) of a length of time, in which a measured value of SNR is below a predetermined "threshold" to a total length of the measuring time, and a ratio (hereunder referred to simply as a second ratio) of a length of time, in which a measured value of RSSI is below a predetermined "threshold", to a total length of the measuring time are detected and that the first ratio functions mainly when the "threshold" of RSSI is predetermined to a relatively low value; and the second ratio functions mainly when the "threshold" of RSSI is predetermined to a relatively high value, thereby optimizing the hand-off timing.

To evaluate the first ratio according to the present invention, a total length $t_1$ of time in which a measured value of SNR being below that of the predetermined "threshold" within a length $T_1$ of the measuring time is first evaluated. Thereafter, the first ratio ($t_1/T_1$) is obtained by dividing $T_1$ into $t_1$. Further, the detection of the second ratio according to the present invention is performed in the same way. The detection of the SNR and RSSI and the setting of the "threshold" of the SNR are performed by using hardware of a receiver, while the setting of $t_1$ and $T_1$ and of the "threshold" of the RSSI is performed by utilizing information in the data base provided within a central switching office.

As described above, the present invention can provide optimal timing of a hand-off in relation to the given arrangement of the small-cells or zones by making use of a combination of the SNR system and the RSSI system.

BRIEF DESCRIPTION OF THE DRAWINGS

Other objects and advantages of the present invention will be understood by those of ordinary skill in the art after referring to the detailed description of a preferred embodiments contained herein and to the drawings, wherein.

It is to be noted that the same numerals indicate the like or corresponding components in the figures.

DESCRIPTION OF PREFERRED EMBODIMENTS

Figure 1:
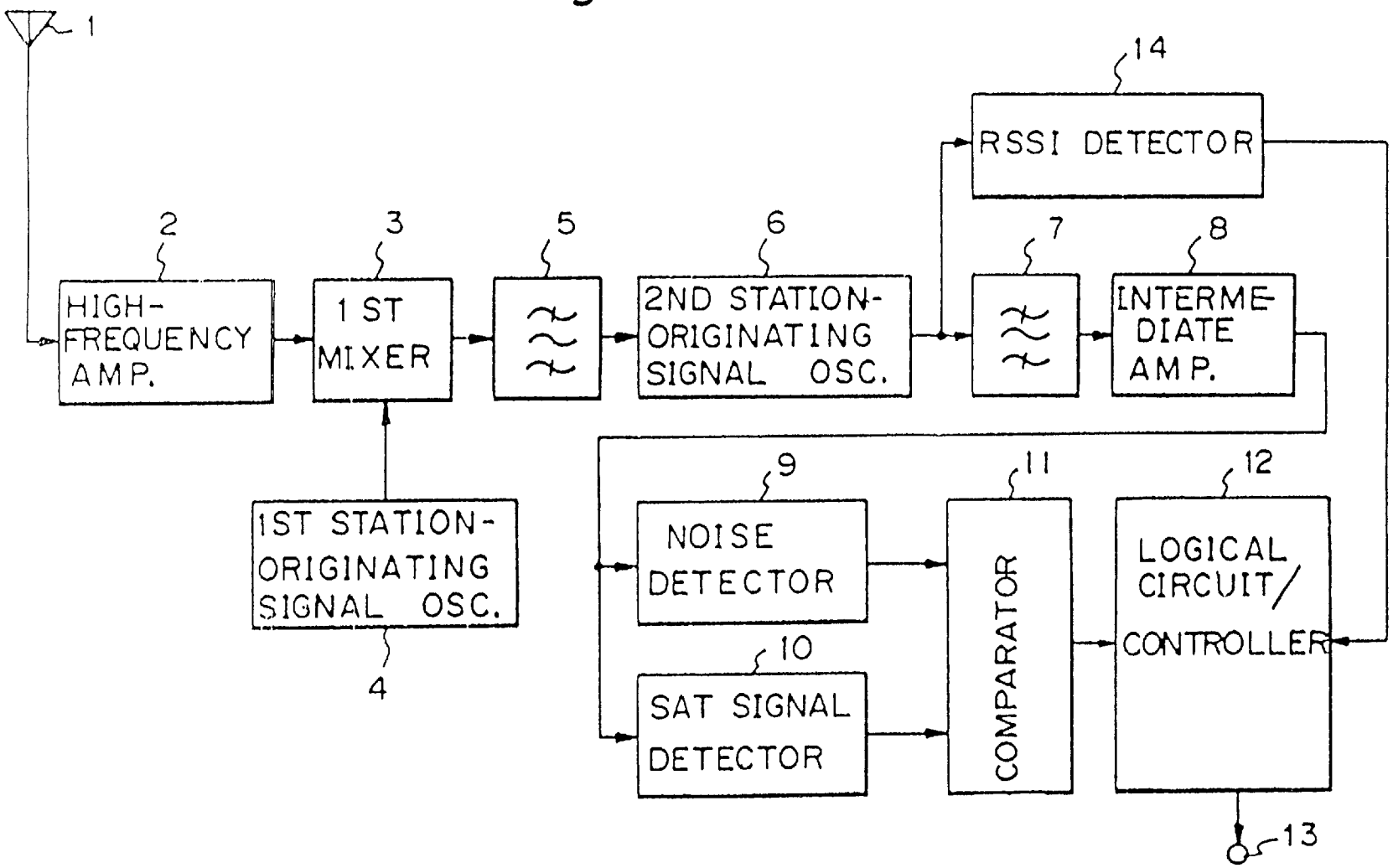
FIG. 1 is a block diagram of an apparatus or system for a hand-off of a call-in-progress embodying the present invention.

Hereinafter, one embodiment of the present invention will be detailedly described with reference to the accompanying drawings. In FIG. 1, reference numerals 1 through 13 indicate the same components as those in the prior art system (excluding software). An RSSI detector generally indicated by reference numeral 14 has an output terminal connected to an input port of a logical circuit/controller 12.

Figure 2:
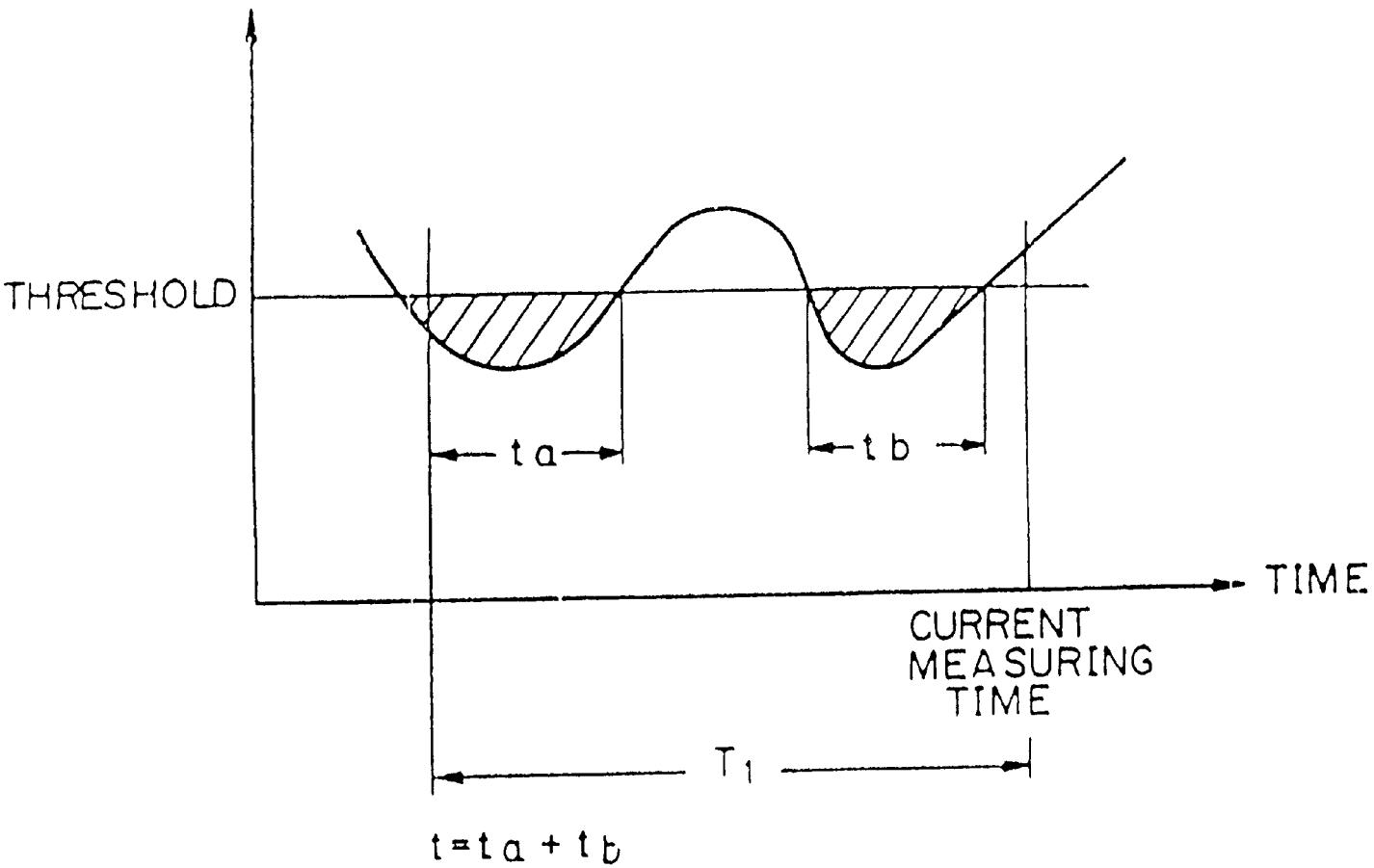
FIG. 2 is an explanatory diagram showing an example of detecting the first and second ratios in accordance with the present invention.
Figure 3:
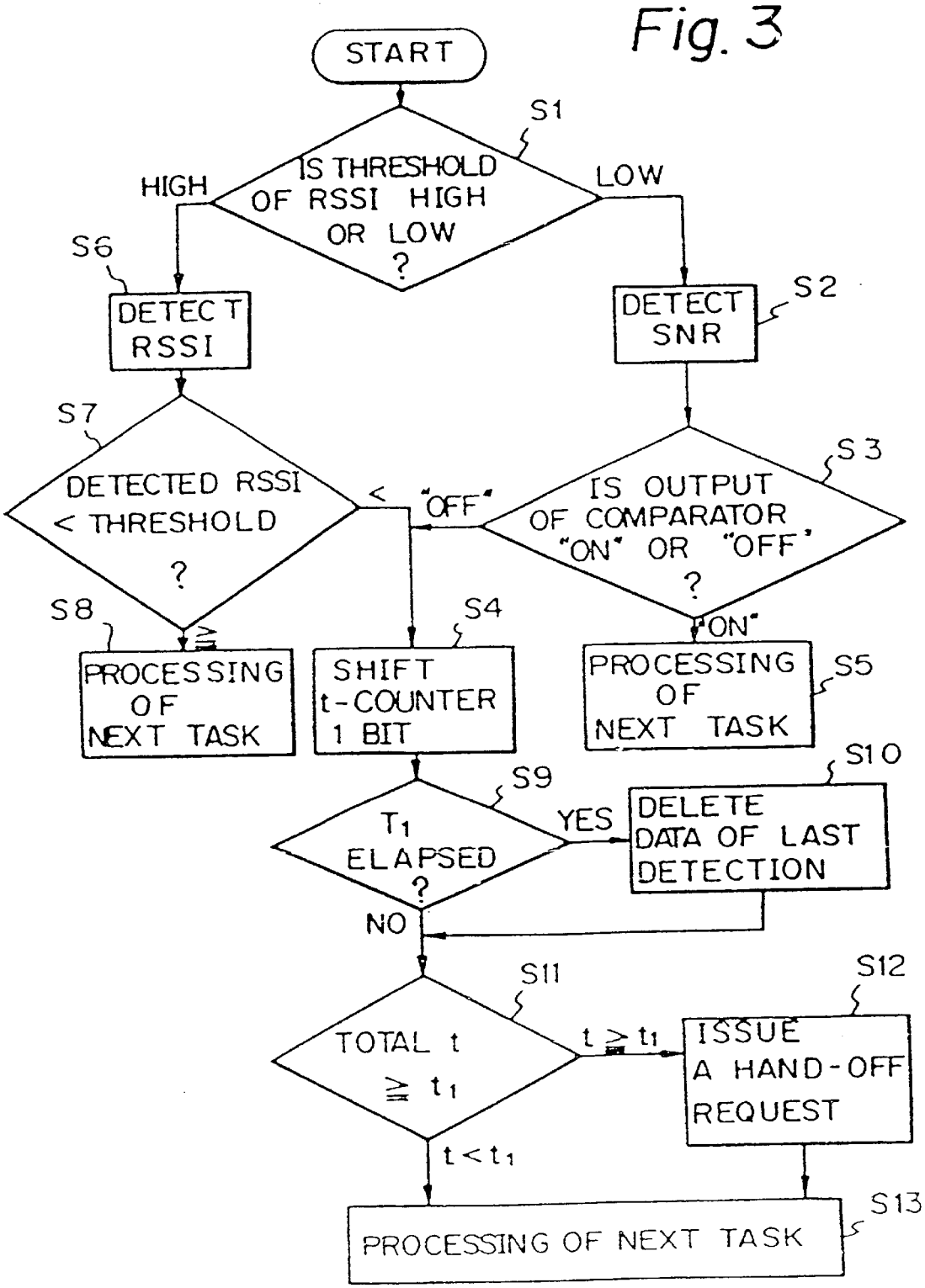
FIG. 3 is a flowchart for illustrating a procedure of determining timing of a hand-off in one embodiment of the present invention.

FIG. 2 is an explanatory diagram illustrating a system of detecting a ratio of time when a detected value of the RSSI is below the "threshold" to a length of time of measuring the RSSI. FIG. 3 is a flowchart showing procedures for issuing a hand-off request.

The SNR is detected in the same manner as in the above-described conventional system. A total length t of time in which the detected value of the SNR is below the "threshold" is given by summing up periods of time ta and tb shown in FIG. 2 as follows:

$$t=ta+tb$$

Further, the first ratio is computed from a ratio of the total length t to a length $T_1$ of the current measuring time.

On the other hand, in case of the RSSI system, the detection of RSSI involves a step of amplifying an output of a second station-originating signal oscillator/mixer 6 by use of the RSSI detector 14 including a logarithmic amplifier and further steps of rectifying the thus amplified output to produce DC output. The outputs of the RSSI detector 14 are sampled 100 times per 1 millisecond by means of the controller, and a resultant mean value is compared with the "threshold" of RSSI. Then the second ratio of a length t when the detected value of the RSSI is below the "threshold" as illustrated in FIG. 2 to the time width $T_1$ is computed.

Next, the procedure for sending out the hand-off request will be described hereinbelow, referring to the flowchart of FIG. 3.

At the time of the system start, a predetermined value of the total length $t_1$ of time when the detected value of SNR or RSSI is below the predetermined "threshold" thereof, a predetermined value of the length $T_1$ of the time for measuring or detecting SNR or RSSI and a "threshold" of RSSI for selecting one of the SNR and RSSI systems are down-line-loaded from the data base provided in the central switching office to the logical circuit/controller 12 and are then stored therein. The subsequent step of the procedure is to determine whether the "threshold" of the RSSI is relatively high or low, that is, whether the "threshold" is below or above a preset value (step S1). If below, the SNR system is selected (step S2). Contrarily, if above, the RSSI system is selected (step S6).

First, in case that the SNR system is selected, an output of the SNR detecting circuit, that is, the output level at the output terminal of the SNR detecting circuit is read to judge whether the level of the output terminal indicates "ON" or "OFF" status of the SNR detecting circuit, that is, whether the comparator 11 outputs the "off" state signal or the "on" state signal (step S3). If the output level of the terminal 13 indicates "ON" status (that is, the output of the comparator 11 indicates "off" state of the comparator 11), the currently existing data of a t-counter are shifted one digit or bit position (step S4), and at the same time 1 (corresponding to a given clocking period) is added to contents of a storing means, for example, another counter (hereunder referred to as a T-counter) provided in the logical circuit/controller 12 for counting the time passed since the start of the current detection or measurement of the SNR. If time of $T_1$ has elapsed since the start of the detection and further the data obtained by the last measurement of SNR effected in the previous measuring time of $T_1$ is left in the t-counter, the data are deleted because of their unnecessariness (step S10).

The contents of the t-counter, which is used to represent the total length t of time when the detected SNR is below the "threshold", are checked (step S11). If the total t exceeds $t_1$, a signal indicating the hand-off request (that is, a hand-off signal) is issued (step S12). If not, the system proceeds to the next task (step S13). The task shown in FIG. 3 is executed every clocking period, and hence the hand-off request is sent out just when the hand-off to the next zone is required due to deterioration of the SNR.

Next, in case where the RSSI system is selected, the mean value of the detected RSSI is evaluated by executing another task to make a comparison between the mean value and the "threshold" of RSSI (step S7). If the mean value is below the "threshold", the presently existing data in the t-counter are shifted one digit, and simultaneously 1 is added to the contents of the T-counter. Subsequently, the hand-off time is determined in the same procedure as those of the SNR system.

Figure 4:
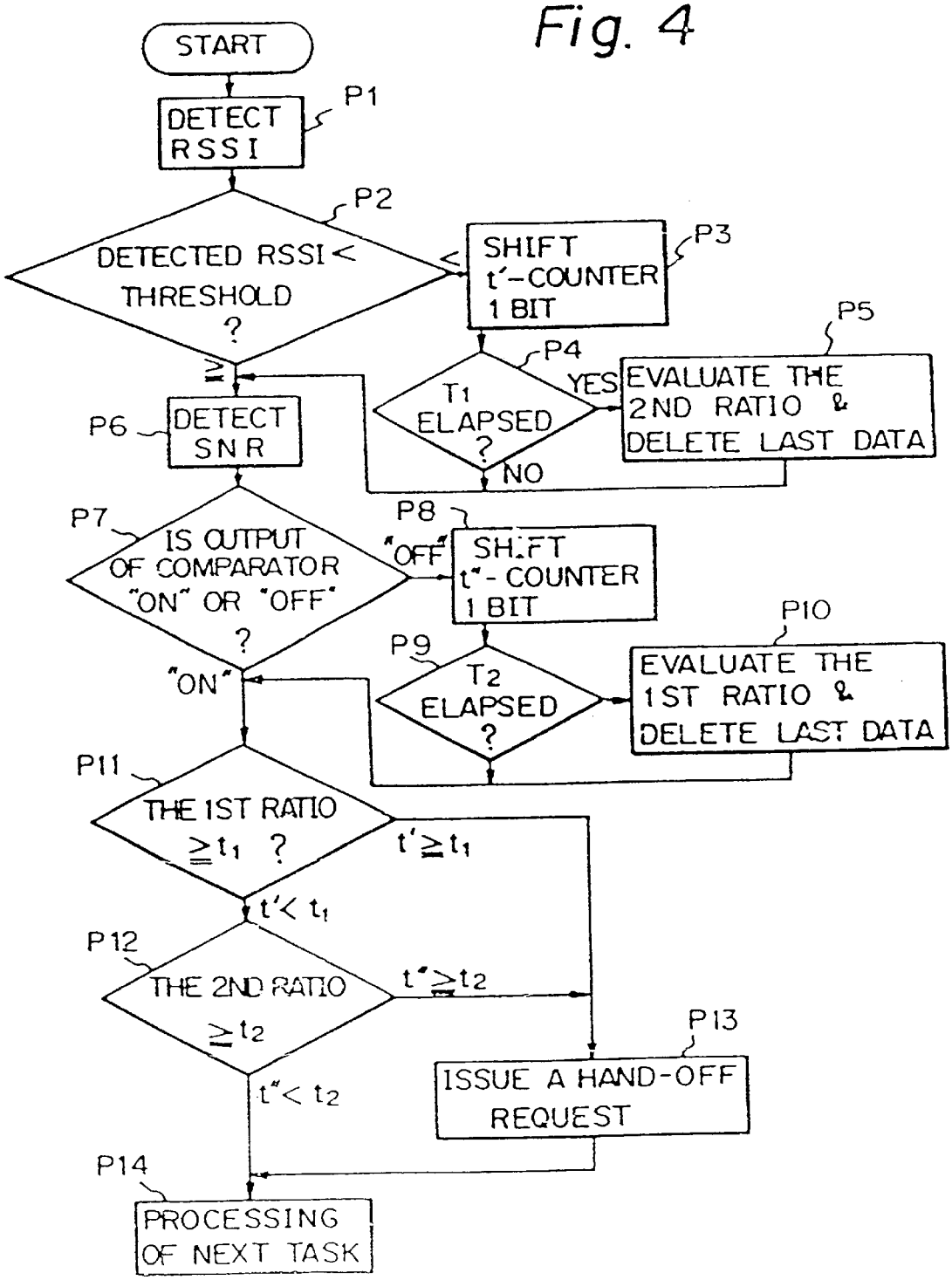
FIG. 4 is a flowchart for illustrating another procedure of determining timing of a hand-off in another embodiment of the present invention.
Figure 5:
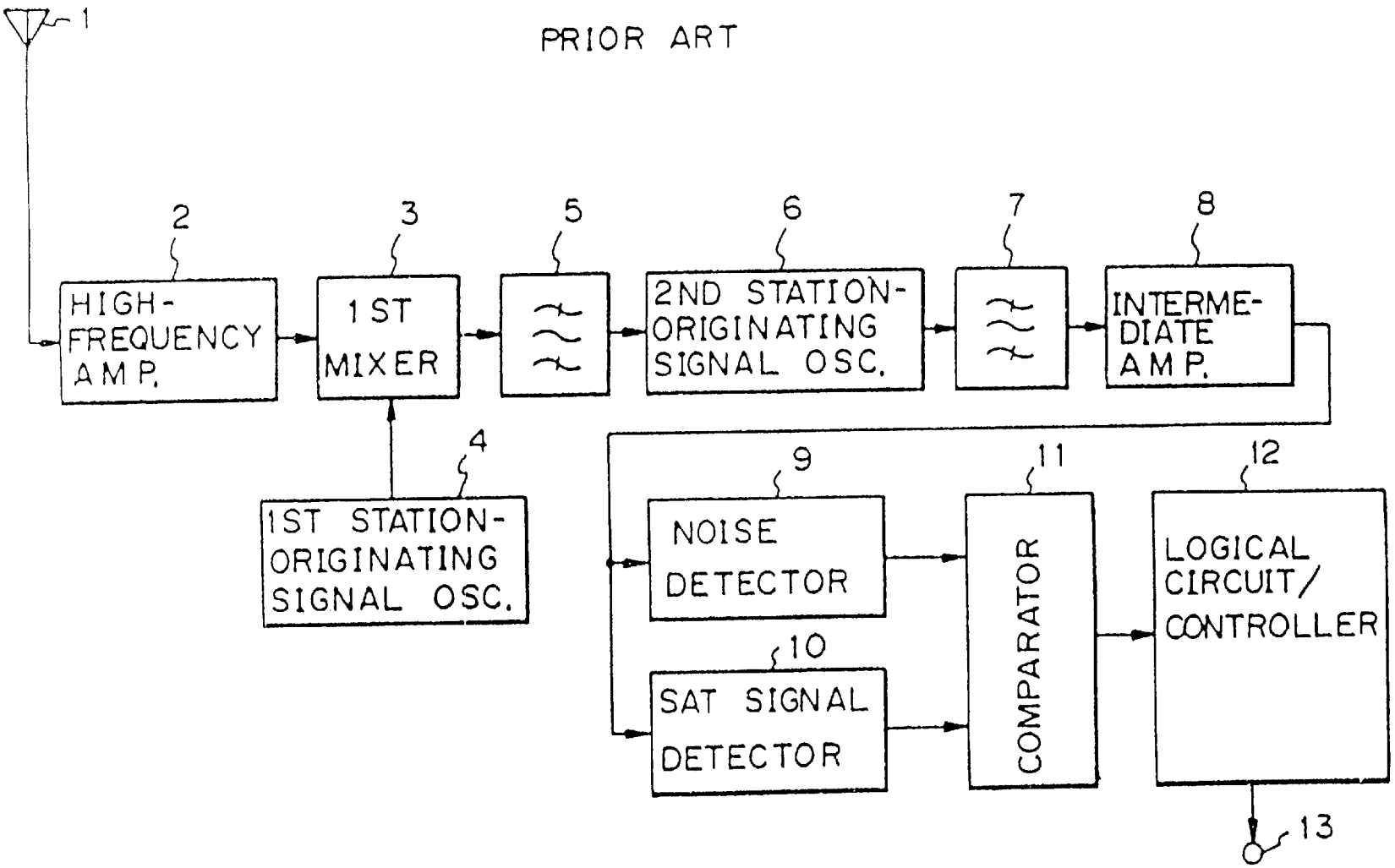
Fig. 5 PRIOR ART
FIG. 5 is a block diagram of a conventional apparatus or system for a hand-off of a call-in-progress.

Directing now attention to FIG. 4, there is shown the flowchart of the procedure of another embodiment of the present invention. The detection and evaluation of both the RSSI and SNR is constantly effected regardless of the "threshold" of the RSSI; and if timing of a hand-off is determined from either of the evaluated values of the above-described first and second ratios $(t/T)_1$ and $(t/T)_2$, the hand-off request is issued (step P13). Generally, as shown in this figure, a first and second sets $(t_1, T_1)$ and $(t_2, T_2)$, respectively. Further, as t in the embodiment of FIG. 3, $t_1$ and $t_2$ indicate thresholds of the total length t of time when the detected values of the SNR and RSSI are below their corresponding predetermined "thresholds", respectively. Thus, in this embodiment, a t'-counter and a t"-counter are used to measure such total lengths of the time in which the detected values of the SNR and RSSI are below their "thresholds", respectively (steps P3 and P8). Furthermore, $T_1$ and $T_2$, indicate "thresholds" of time passed since the start of the detection of the SNR and RSSI, respectively (steps P4 and P9). In this embodiment, "thresholds" of the first and second ratios $(t/T)_1$ and $(t/T)_2$ may be reset to be different from each other. Thus, in general, data $t_1$, $t_2$, $T_1$ and $T_2$ can be set in the data base of the central switching office such that $t_1 \neq t_2$; and $T_1 \neq T_2$. However, in practice, these data are usually set as follows:

$t_1 = t_2$; and $T_1 = T_2$.

In accordance with the procedure for sending out the hand-off request in addition to those in the above-described embodiment, the timing of the hand-off can be determined from a ratio of time, in which either one of the detected SNR and RSSI is below the corresponding "threshold", to the total length of the measuring time. In this case, a truth table is obtained as shown in Table 1.

TABLE 1

A Truth Table

| RSSI | SNR | OUTPUT |
|---|---|---|
| 0 | 0 | 0 |
| 1 | 0 | 1 |
| 0 | 1 | 1 |
| 1 | 1 | 1 |

Furthermore, it is possible to determine timing of a hand-off from specified equations and a truth table by combining all the factors such as the "threshold" itself of SNR, the first ratio $(t/T)_1$, the "threshold" itself of RSSI, and the second ratio $(t/T)_2$.

Further, although in the above-described embodiments, noises, frequencies of which are close to those of the SAT signals, are utilized for detection of the SNR, it is also feasible to detect the SNR by employing outband noises.

The invention described herein may have many variations. Thus, the preferred embodiment described herein is to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. In a small-cell mobile radio communication system having a central switching office provided with a hand-off apparatus for determining optimal timing of a hand-off of a call-in-progress and for sending out a hand-off signal at the determined time of a hand-off, a plurality of base stations and a mobile station, said hand-off apparatus including:

a signal input means for receiving and amplifying a high-frequency signal from a mobile station and for converting the amplified signal into an intermediate-frequency signal;

a signal-to-noise ratio detecting means connected to said signal input means for converting the intermediate-frequency signal into a voice signal, for detecting the signal-to-noise ratio of the voice signal, and for outputting a first on-state signal when the detected signal-to-noise ratio exceeds to equals a predetermined first threshold and a first off-state signal when the detected signal-to-noise ratio is below the first threshold;

a received signal strength input detecting means connected to said signal input means for detecting and received signal strength input of the intermediate-frequency signal independently of said signal-to-noise ratio detecting means, for outputting a second on-state signal when the detected received signal strength input exceeds or equals a predetermined second threshold and a second off-state signal when the detected received signal strength input is below the second threshold; and control logic means connection to both said signal-to-noise ratio detecting means and said received signal strength input detecting means for selecting the outputs from said signal-to-noise ratio and received signal strength input detecting means, for measuring a first total length of time in which at least one of the signal-to-noise ratio and the received signal strength input is below said corresponding first or second threshold, respectively, by counting said first or second off-state signals, for evaluating the ratio of said first total length of time to a predetermined measuring time of the signal-to-noise ratio and received signal strength input, and for sending out a hand-off signal when the evaluated ratio exceeds a predetermined third threshold thereby determining optimal timing of a hand-off of a call-in-progress.

2. A hand-off apparatus as set forth in claim 1, wherein said signal-to-noise ratio detecting means includes:

a signal detecting means for detecting a supervisory audio tone signal in said voice signal;

a noise detecting means for detecting noise having approximately the same frequency as the supervisory audio tone signal; and comparing means connected to both said signal detecting means and said noise detecting means for evaluating the signal-to-noise ratio from the detected supervisory audio tone signal and said noise.

3. A method for a hand-off of a call-in-progress in a small-cell mobile radio communication system, including the steps of:

converting a signal received from a mobile station into an intermediate-frequency signal;

detecting both a signal-to-noise ratio and a received signal strength input from the intermediate-frequency signal simultaneously with and independently of each other;

determining timing of a hand-off from the detected signal-to-noise ratio and received signal strength input on a predetermined condition; and sending out a hand-off signal at the determined time of a hand-off, wherein said determining step comprises comparing a predetermined threshold value for the received signal strength input to a preset value; and either determining timing of a hand-off from the signal-to-noise ratio if the threshold value is below the preset value, or else determining timing of a hand-off from the received signal strength input if the threshold value is above the preset value.

4. A method for a hand-off of a call-in-progress in a small-cell mobile radio communication system, including the steps of:

converting a signal received from a mobile station into an intermediate-frequency signal;

detecting both a signal-to-noise ratio and a received signal strength input from the intermediate-frequency signal simultaneously with and independently of each other;

determining timing of a hand-off from the detected signal-to-noise ratio and received signal strength input on a predetermined condition; and sending out a hand-off signal at the determined time of a hand-off, wherein the timing of a hand-off is determined on the basis of the detected signal-to-noise ratio when the value of said received signal strength input is below a first threshold and determined on the basis of the detected received signal strength input when the value of said received signal strength input is above or equals said first threshold.

5. A method for a hand-off of a call-in-progress in a small-cell mobile radio communication system, including the steps of:

converting a signal received from a mobile station into an intermediate-frequency signal;

detecting both a signal-to-noise ratio and a received signal strength input from the intermediate-frequency signal simultaneously with and independently of each other;

determining timing of a hand-off from the detected signal-to-noise ratio and received signal strength input on a predetermined condition; and sending out a hand-off signal at the determined time of a hand-off, wherein the timing of a hand-off is determined by the detected received signal strength input and the detected signal-to-noise ratio, whichever is first to match or exceed said first or second predetermined values, respectively.

6. A method for a hand-off of a call-in-progress in a small-cell mobile radio communication system, including the steps of:

converting a signal received from a mobile station into an intermediate-frequency signal;

detecting both a signal-to-noise ratio and a received signal strength input from the intermediate-frequency signal simultaneously with and independently of each other;

determining timing of a hand-off from the detected signal-to-noise ratio and received signal strength input on a predetermined condition; and sending out a hand-off signal at the determined time of a hand-off, wherein the timing of a hand-off is determined from a first ratio of detected time, in which the detected signal-to-noise ratio is below a second threshold, to a measuring period of time, and from a second ratio of detected time, in which the detected received signal strength input is below a third threshold, to a measuring period of time.

7. A method for a hand-off of a call-in-progress as set forth in claim 6, wherein the timing of a hand-off is determined on the basis of any combination of said second threshold of the signal-to-noise ratio and said first ratio, and of said third threshold of the received signal strength input and said second ratio.

8. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A;

C. determining that said call-in-progress should be handed off when said signal-to-noise ratio at least equals a first threshold value and said received signal strength magnitude is less than a second threshold; and D. determining that said call-in-progress should be handed off when said received signal strength magnitude is below said first threshold and said signal to noise ratio is less than a third threshold.

9. In a cellular mobile radio communication system, the method for determining when a call-in-progress should be handed off according to claim 8 further comprising the step of:

E. converting the signal received from said mobile station into an intermediate-frequency signal.

10. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A;

C. determining that said call-in-progress should be handed off when said signal-to-noise ratio at least equals a first threshold value and said received signal strength magnitude is less than a second threshold; and D. determining that said call-in-progress should be handed off when said received signal strength magnitude is below said first threshold and said signal-to-noise ratio is less than a third threshold, wherein step D includes the steps of:

D1. measuring said signal for a first predetermined time interval;

D2. evaluating a percentage of said first predetermined time interval during which said signal-to-noise ratio is below said third threshold; and D3. determining that said call-in-progress should be handed off when said percentage determined in step D2 at least equals a first ideal value.

11. In a cellular mobile radio communication system, the method for determining when a call-in-progress should be handed off according to claim 10 wherein step C includes the steps of:

C1. measuring said signal for a second predetermined time interval;

C2. evaluating a percentage of said second predetermined time interval during which said received signal strength magnitude is below said second threshold; and C3. determining that said call-in-progress should be handed off when said percentage determined in step C2 at least equals a second ideal value.

12. In a cellular mobile radio communication system, the method for determining when a call-in-progress should be handed off according to claim 8 wherein said second threshold and said third threshold are equal.

13. In a cellular mobile radio communication system, the method for determining when a call-in-progress should be handed off according to claim 8 wherein said second threshold and said third threshold are not equal.

14. In a cellular mobile radio communication system, the method for determining when a call-in-progress should be handed off according to claim 11 wherein said first predetermined time interval and said second predetermined time interval are equal.

15. In a cellular mobile radio communication system, the method for determining when a call-in-progress should be handed off according to claim 11 wherein said first predetermined time interval and said second predetermined time interval are not equal.

16. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A; and C. determining that said call-in-progress should be handed off from both said generated signal-to-noise ratio and said received signal strength magnitude, wherein said determining step comprises:

comparing a predetermined threshold value for the received signal strength magnitude to a preset value; and either determining timing of a hand-off from the signal-to-noise ratio if the threshold value is below the preset value, or else determining timing of a hand-off from the received signal strength magnitude if the threshold value is above the preset value.

17. In a cellular mobile radio communication system, the method for determining when a call-in-progress should be handed off according to claim 16 further comprising the step of:

E. converting the signal received from said mobile station into an intermediate-frequency signal.

18. In a cellular mobile radio communication system, the method for determining when a call-in-progress should be handed off according to claim 16 wherein step C comprises the step of:

C1. determining that said call-in-progress should be handed off when said received signal strength magnitude at least equals a first threshold value and said received signal strength magnitude is less than a second threshold.

19. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A;

C. determining that said call-in-progress should be handed off from both said generated signal-to-noise ratio and said received signal strength magnitude, wherein step C comprises the step of:

C1. determining that said call-in-progress should be handed off when said received signal strength magnitude at least equals a first threshold value and said received signal strength magnitude is less than a second threshold, wherein step C1 includes the step of:

C1a. measuring said signal for a first predetermined time interval;

C1b. evaluating a percentage of said first predetermined time interval during which said received signal strength magnitude is below said second threshold; and C1c. determining that said call-in-progress should be handed off when said percentage determined in step C1b at least equals a first ideal value.

20. In a cellular mobile radio communication system, the method for determining when a call-in-progress should be handed off according to claim 16 wherein step C comprises the step of:

C2. determining that said call-in-progress should be handed off when said received signal strength magnitude is below a first threshold and said signal-to-noise ratio is less than a second threshold.

21. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal

B. measuring a received signal strength magnitude of said signal simultaneously with, and independently of, step A; and C. determining that said call-in-progress should be handed off from both said generated signal-to-noise ratio and said received signal strength magnitude, wherein step C comprises the step of:

C2. determining that said call-in-progress should be handed off when said received signal strength magnitude is below a first threshold and said signal-to-noise ratio is less than a second threshold, wherein step C2 includes the steps of:

C2a. measuring said signal for a first predetermined time interval;

C2b. evaluating a percentage of said first predetermined time interval during which said signal-to-noise ratio is below said second threshold; and C2c. determining that said call-in-progress should be handed off when said percentage determined in step C2b at least equals an ideal value.

22. In a cellular mobile radio communication system, the method for determining when a call-in-progress should be handed off according to claim 16 wherein step C comprises the step of:

C3. generating a hand-off signal upon the first occurrence of said received signal strength magnitude exceeding a first threshold and said signal-to-noise ratio exceeding a second threshold.

23. Apparatus for use in a small-cell mobile radio communication system for determining an optimal timing of a hand-off of a call-in-progress, said apparatus comprising:

means responsive to a high-frequency signal for detecting a voice signal:

first means responsive to said voice signal for generating a signal-to-noise ratio for said voice signal;

second means responsive to said high-frequency signal for generating a received signal strength magnitude from said high-frequency signal; and a control means responsive to said signal-to-noise ratio and said received signal strength magnitude for generating a hand-off signal if said received signal strength magnitude is below a first threshold and said signal-to-noise ratio is below a second threshold and for generating a hand-off signal if said received signal strength magnitude is at least equal to said first threshold and below a third threshold, wherein said control means comprises means for comparing a predetermined threshold value for the received signal strength input to a preset value; and means for either determining timing of a hand-off from the signal-to-noise ratio if the threshold value is below the preset value, or else determining timing of a hand-off from the received signal strength input if the threshold value is above the preset value.

24. Apparatus for use in a small-cell mobile radio communication system for determining an optimal timing of a hand-off of a call-in-progress, said apparatus comprising:

means responsive to a high-frequency signal for detecting a voice signal:

first means responsive to said voice signal for generating a signal-to-noise ratio for said voice signal;

second means responsive to said high-frequency signal for generating a received signal strength magnitude from said high-frequency signal; and a control means responsive to said signal-to-noise ratio and said received signal strength magnitude for generating a hand-off signal if said received signal strength magnitude is below a first threshold and said signal-to-noise ratio is below a second threshold and for generating a hand-off signal if said received signal strength magnitude is at least equal to said first threshold and below a third threshold.

wherein said detecting means comprises an audio signal detecting means for detecting a supervisory audio tone signal magnitude in said voice signal and said first generating means comprises noise detecting means for detecting noise magnitude of noise having approximately the same frequency as said supervisory audio tone signal and a comparator responsive to said audio tone signal magnitude signal and said noise magnitude for generating said signal-to-noise ratio.

25. Apparatus for use in a small-cell mobile radio communication system for determining an optimal timing of a hand-off of a call-in-progress, said apparatus comprising:

means responsive to a high-frequency signal for detecting a voice signal;

first means responsive to said voice signal for generating a signal-to-noise ratio for said voice signal;

second means responsive to said high-frequency signal for generating a received signal strength magnitude from said high-frequency signal; and a control means responsive to said signal-to-noise ratio and said received signal strength magnitude for generating a hand-off signal if said received signal strength magnitude is below a first threshold and said signal-to-noise ratio is below a second threshold and for generating a hand-off signal if said received signal strength magnitude is at least equal to said first threshold and below a third threshold.

wherein said control means comprises:

means for measuring a time interval of predetermined duration; and means for determining a first percentage of said time interval during which said signal-to-noise ratio is less than said second threshold and a second percentage of said time interval during which said received signal strength magnitude is less than said third threshold.

26. Apparatus for use in a small-cell mobile ratio communication system for determining an optimal timing of a hand-off of a call-in-progress, said apparatus comprising:

means responsive to a high-frequency signal for detecting a voice signal;

first means responsive to said voice signal for generating a signal-to-noise ratio for said voice signal:

second means responsive to said high-frequency signal for generating a received signal strength magnitude from said high-frequency signal; and a control means responsive to said signal-to-noise ratio and said received signal strength magnitude for generating a hand-off signal upon the first occurrence of said received signal strength magnitude exceeding a first threshold and said signal-to-noise ratio exceeding a second threshold, wherein said control means comprises means for comparing a predetermined threshold value for the received signal strength input to a preset value; and means for determining timing of a hand-off from the signal-to-noise ratio if the threshold value is below the preset value, or else determining timing of a head-off from the received signal strength input if the threshold value is above the preset value.

27. Apparatus for use in a small-cell mobile ratio communication system for determining an optimal timing of a hand-off of a call-in-progress, said apparatus comprising:

means responsive to a high-frequency signal for detecting a voice signal;

means responsive to said voice signal for generating a signal-to-noise ratio for said voice signal;

second means responsive to said high-frequency signal for generating a received signal strength magnitude from said high-frequency signal; and a control means responsive to said signal-to-noise ratio and said received signal strength magnitude for generating a hand-off signal upon the first occurrence of said received signal strength magnitude exceeding a first threshold and said signal-to-noise ratio exceeding a second threshold, wherein said detecting means comprises an audio signal detecting means for detecting a supervisory audio tone signal magnitude in said voice signal and said first generating means comprises noise detecting means for detecting noise magnitude of noise having approximately the same frequency as said supervisory audio tone signal and a comparator responsive to said audio tone signal magnitude signal and said noise magnitude for generating said signal-to-noise ratio.

28. Apparatus for use in a small-cell mobile radio communication system for determining an optimal timing of a hand-off of a call-in-progress, said apparatus comprising:

means responsive to a high-frequency signal for detecting a voice signal;

first means responsive to said voice signal for generating a signal-to-noise ratio for said voice signal;

second means responsive to said high-frequency signal for generating a received signal strength magnitude from said high-frequency signal; and a control means responsive to said signal-to-noise ratio and said received signal strength magnitude for generating a hand-off signal upon the first occurrence of said received signal strength magnitude exceeding a first threshold and said signal-to-noise ratio exceeding a second threshold, wherein said control means comprises:

means for measuring a time interval of predetermined duration; and means for determining a first percentage of said time interval during which said signal-to-noise ratio is less than said second threshold and a second percentage of said time interval during which said received signal strength magnitude is less than [said] *a* third threshold.

29. A method for a hand-off of a call-in-progress in a small-cell mobile radio communication system, including the steps of:

converting a signal received from a mobile station into an intermediate-frequency signal;

detecting both a signal-to-noise ratio and a received signal strength input from the intermediate-frequency signal simultaneously and independently with each other;

determining timing of a hand-off from the detected signal-to-noise ratio and received signal strength input on a predetermined condition; and sending out a hand-off signal at the determined time of a hand-off, wherein said determining step includes the steps of measuring said intermediate-frequency signal for a first predetermined time interval;

evaluating a percentage of said first predetermined time interval during which said signal-to-noise ratio is below a threshold; and determining that said call-in-progress should be handed off when said percentage determined in said evaluating step at least equals a first ideal value.

30. Apparatus for use in a small-cell mobile radio communication system for determining an optimal timing of a hand-off of a call-in-progress, said apparatus comprising:

means responsive to a high-frequency signal for detecting a voice signal;

first means responsive to said voice signal for generating a signal-to-noise ratio for said voice signal;

second means responsive to said high-frequency signal for generating a received signal strength magnitude from said high-frequency signal; and a control means responsive to said signal-to-noise ratio and said received signal strength magnitude for generating a hand-off signal if said received signal strength magnitude is below a first threshold and said signal-to-noise ratio is below a second threshold and for generating a hand-off signal if said received signal strength magnitude is at least equal to said first threshold and below a third threshold, wherein said control means comprises means for measuring said high-frequency signal for a first predetermined time interval;

means for evaluating a percentage of said first predetermined time interval during which said signal-to-noise ratio is below said second threshold; and means for determining that said call-in-progress should be handed off when said percentage determined by said evaluating means at least equals a second ideal value.

31. Apparatus for use in a small-cell mobile radio communication system for determining an optimal timing of a hand-off of a call-in-progress, said apparatus comprising:

means responsive to a high-frequency signal for detecting a voice signal;

first means responsive to said voice signal for generating a signal-to-noise ratio for said voice signal;

second means responsive to said high-frequency signal for generating a received signal strength magnitude from said high-frequency signal; and a control means responsive to said signal-to-noise ratio and said received signal strength magnitude for generating a hand-off signal upon the first occurrence of said received signal strength magnitude exceeding a first threshold and said signal-to-noise ratio exceeding a second threshold, wherein said control means comprises means for measuring said high-frequency signal for a first predetermined time interval;

means for evaluating a percentage of said first predetermined time interval during which said signal-to-noise ratio is below said second threshold; and means for determining that said call-in-progress should be handed off when said percentage determined by said evaluating means at least equals a second ideal value.

32. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A;

C. determining that said call-in-progress should be handed off when said signal-to-noise ratio at least equals a first threshold value and said received signal strength magnitude is less than a second threshold;

D. measuring said signal for a first predetermined time interval;

E. evaluating a percentage of said first predetermined time interval during which said signal-to-noise ratio is below a third threshold; and F. determining that said call-in-progress should be handed off when said percentage determined in step E at least equals a second ideal value.

33. In a cellular mobile ratio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A;

C1a. measuring said signal for a first predetermined time interval;

C1b. evaluating a percentage of said first predetermined time interval during which said received signal strength magnitude is below a second threshold; and C1c. determining that said call-in-progress should be handed off when said percentage determined in step C1b at least equals a first ideal value.

34. In a cellular mobile ratio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A;

C2a. measuring said signal for a first predetermined time interval;

C2b. evaluating a percentage of said first predetermined time interval during which said signal-to-noise ratio is below a threshold; and C2c. determining that said call-in-progress should be handed off when said percentage determined in step C2b at least equals a first ideal value.

35. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:

A. generating a signal-to-noise ratio from said signal;

B. measuring a received signal strength magnitude of said signal simultaneously with, and independently of, step A;

C. determining that said call-in-progress should be handed off when said signal-to-noise ratio at least equals a first threshold value and said received signal strength magnitude is less than a second threshold; and D. determining that said call-in-progress should be handed off when said received signal strength magnitude is below said first threshold and said signal-to-noise ratio is less than a third threshold, wherein step C includes the steps of:

C1. measuring said signal for a second predetermined time interval;

C2. evaluating a percentage of said second predetermined time interval during which said received signal strength magnitude is below a second threshold; and C3. determining that said call-in-progress should be handed off when said percentage determined in step C2 at least equals a first ideal value.

*36. In a small-cell mobile radio communication system having a central switching office provided with a hand-off apparatus for determining optimal timing of a hand-off of a call-in-progress and for sending out a hand-off signal at the determined time of a hand-off, a plurality of base stations and a mobile station, said hand-off apparatus including:*

*a signal input means for receiving a signal;*

*a signal quality detecting means connected to said signal input means for detecting the signal quality of the signal, and for outputting a first on-state signal when the detected signal quality exceeds or equals a predetermined first threshold and a first off-state signal when the detected signal quality is below the first threshold;*

*a received signal strength input detecting means connected to said signal input means for detecting received signal strength input of the signal independently of said signal quality detecting means, for outputting a second on-state signal when the detected received signal strength input exceeds or equals a predetermined second threshold and a second off-state signal when the detected received signal strength input is below the second threshold; and*

*control logic means connected to both said signal quality detecting means and said received signal strength input detecting means for selecting the outputs from said signal quality and received signal strength input detecting means, for measuring a first total length of time in which at least one of the signal quality and the received signal strength input is below said corresponding first or second threshold, respectively, by counting said first or second off-state signals, and for evaluating the ratio of said first total length of time to a predetermined measuring time of the signal quality and received signal strength input.*

*37. A method for a hand-off of a call-in-progress in a small-cell mobile radio communication system, including the steps of:*

*receiving a signal;*

*detecting both a signal quality and a received signal strength input from the signal simultaneously with and independently of each other;*

*determining timing of a hand-off from the detected signal quality when the detected received signal strength input satisfies a predetermined condition and from the detected received signal strength input when the detected received signal strength input does not satisfy the predetermined condition; and*

*sending out a hand-off signal at the determined time of a hand-off.*

*38. A method for a hand-off of a call-in-progress in a small-cell mobile radio communication system, including the steps of:*

*receiving a signal;*

*detecting both a signal quality and a received signal strength input from the signal simultaneously with and independently of each other;*

*determining timing of a hand-off from the detected signal quality and detected received signal strength input on a predetermined condition; and*

*sending out a hand-off signal at the determined time of a hand-off,*

*wherein said determining step comprises*

*comparing a predetermined threshold value for the received signal strength input to a preset value; and*

*either determining timing of a hand-off from the signal quality if the threshold value is below the preset value, or else determining timing of a hand-off from the received signal strength input if the threshold value is above the preset value.*

*39. A method for a hand-off of a call-in-progress in a small-cell mobile radio communication system, including the steps of:*

*receiving a signal;*

*detecting both a signal quality and a received signal strength input from the signal simultaneously with and independently of each other;*

*determining timing of a hand-off from the detected signal quality and received signal strength input on a predetermined condition; and*

*sending out a hand-off signal at the determined time of a hand-off,*

*wherein the timing of a hand-off is determined on the basis of the detected signal quality when the value of said received signal strength input is below a first threshold*

*and determined on the basis of the detected received signal strength input when the value of said received signal strength input is above or equals said first threshold.*

*40. A method for a hand-off of a call-in-progress in a small-cell mobile radio communication system, including the steps of:*

*receiving a signal;*

*detecting both a signal quality and a received signal strength input from the signal simultaneously with and independently of each other;*

*determining timing of a hand-off from the detected signal quality and received signal strength input on a predetermined condition; and*

*sending out a hand-off signal at the determined time of a hand-off;*

*wherein the timing of a hand-off is determined by the first occurrence of one of the following conditions (a) the detected received signal strength input matching or exceeding a first predetermined value and (b) the detected signal quality matching or exceeding a second predetermined value.*

*41. A method according to claim 40, further comprising the step of:*

*converting the signal received from a mobile station into an intermediate-frequency signal.*

*42. A method according to claim 40, wherein said detecting step includes the step of:*

*measuring said signal for a first predetermined time interval.*

*43. A method for a hand-off of a call-in-progress in a small-cell mobile radio communication system, including the steps of:*

*receiving a signal;*

*detecting both a signal quality and a received signal strength input from the signal simultaneously with and independently of each other;*

*determining timing of a hand-off from a first ratio of detected time, in which the detected signal quality is below a second threshold, to a measuring period of time, and from a second ratio of detected time, in which the detected received signal strength input is below a third threshold, to a measuring period of time; and*

*sending out a hand-off signal at the determined time of a hand-off.*

*44. A method as set forth in claim 43, wherein the timing of a hand-off is determined on the basis of any combination of said second threshold of the signal quality and said first ratio, and of said third threshold of the received signal strength input and said second ratio.*

*45. A method for a hand-off of a call-in-progress in a small-cell mobile radio communication system, including the steps of:*

*receiving a signal;*

*detecting both a signal quality and a received signal strength input from the signal simultaneously and independently with each other;*

*determining timing of a hand-off from the detected signal quality and received signal strength input on a predetermined condition; and*

*sending out a hand-off signal at the determined time of a hand-off,*

*wherein said determining step includes the steps of:*

*measuring said signal for a first predetermined time interval;*

*evaluating a percentage of said first predetermined time interval during which said signal quality is below a threshold; and*

*determining that said call-in-progress should be handed off when said percentage determined in said evaluating step at least equals a first ideal value.*

*46. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A;*

*C. determining that said call-in-progress should be handed off when said measurement of signal quality at least equals a first threshold value and said received signal strength magnitude is less than a second threshold; and*

*D. determining that said call-in-progress should be handed off when said received signal strength magnitude is below said threshold and said measurement of signal quality is less than a third threshold.*

*47. In a cellular mobile radio communication system, the method according to claim 46 further comprising the step of:*

*E. converting the signal received from said mobile station into an intermediate-frequency signal.*

*48. In a cellular mobile radio communication system, the method according to claim 46 wherein step D includes the steps of:*

*D1. measuring said signal for a first predetermined time interval;*

*D2. evaluating a percentage of said first predetermined tine interval during which said measurement of signal quality is below said third threshold; and*

*D3. determining that said call-in-progress should be handed off when said percentage determined in step D2 at least equals a first ideal value.*

*49. In a cellular mobile radio communication system, the method according to claim 46 wherein said second threshold and said third threshold are equal.*

*50. In a cellular mobile radio communication system, the method according to claim 46 wherein said second threshold and said third threshold are not equal.*

*51. In a cellular mobile radio communication system, the method according to claim 46 wherein step C includes the steps of:*

*C1. measuring said signal for a second predetermined time interval;*

*C2. evaluating a percentage of said second predetermined time interval during which said received signal strength magnitude is below said second threshold; and*

*C3. determining that said call-in-progress should be handed off when said percentage determined in step C2 at least equals a second ideal value.*

*52. In a cellular mobile radio communication system, the method according to claim 51 wherein said first predetermined time interval and said second predetermined time interval are equal.*

*53. In a cellular mobile radio communication system, the method according to claim 51 wherein said first predetermined time interval and said second predetermined time interval are not equal.*

*54. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. determining that said call-in-progress should be handed off from said generated measurement of signal quality when the received signal strength satisfies a predetermined condition and from said received signal strength magnitude when the received signal strength input does not satisfy the predetermined condition.*

*55. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. determining that said call-in-progress should be handed off from both said generated measurement of signal quality and said received signal strength magnitude, wherein said determining step comprises:*

*comparing a predetermined threshold value for the received signal strength magnitude to a preset value; and*

*either determining timing of a hand-off from the measurement of signal quality if the threshold value is below the preset value, or determining timing of a hand-off from the received signal strength magnitude if the threshold value is above the preset value.*

*56. In a cellular mobile radio communication system, the method according to claim 55 further comprising the step of:*

*D. converting the signal received from said mobile station into an intermediate-frequency signal.*

*57. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. determining that said call-in-progress should be handed off when said received signal strength magnitude at least equals a first threshold value and said received signal strength magnitude is less than a second threshold.*

*58. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A;*

*C. determining that said call-in-progress should be handed off from both said generated measurement of signal quality and said received signal strength magnitude, wherein step c comprises the steps of:*

*C1. determining that said call-in-progress should be handed off when said received signal strength magnitude at least equals a first threshold value and said received signal strength magnitude is less than a second threshold, wherein step C1 includes the steps of:*

*C1a. measuring said signal for a first predetermined time interval;*

*C1b. evaluating a percentage of said first predetermined time interval during which said received signal strength magnitude is below said second threshold; and*

*C1c. determining that said call-in-progress should be handed off when said percentage determined in step C1b at least equals a first ideal value.*

*59. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. determining that said call-in-progress should be handed off when said received signal strength magnitude is below a first threshold and said measurement of signal quality is less than a second threshold.*

*60. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. determining that said call-in-progress should be handed off from both said generated measurement of signal quality and said received signal strength magnitude, wherein step C comprises the steps of:*

*C2. determining that said call-in-progress should be handed off when said received signal strength magnitude is below a first threshold and said measurement of signal quality is less than a second threshold, wherein step C2 includes the steps of:*

*C2a. measuring said signal for a first predetermined time interval;*

*C2b. evaluating a percentage of said first predetermined time interval during which said measurement of signal quality is below said second threshold; and*

*C2c. determining that said call-in-progress should be handed off when said percentage determined in step C2b at least equals in ideal value.*

*61. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. generating a hand-off signal upon the first occurrence of said received signal strength magnitude exceeding a first threshold and said measurement of signal quality exceeding a second threshold.*

*62. Apparatus for use in a small-cell mobile radio communication system for determining an optimal timing of a hand-off of a call-in-progress, said apparatus comprising:*

*means for receiving a high-frequency signal;*

*first means responsive to said high-frequency signal for generating a measurement of signal quality;*

*second means responsive to said high-frequency signal for generating a received signal strength magnitude; and*

*a control means responsive to said measurement of signal quality and said received signal strength magnitude for generating a hand-off signal if said received signal strength magnitude is below a first threshold and said measurement of signal quality is below a second threshold and for generating a hand-off signal if said received signal strength magnitude is at least equal to said first threshold and below a third threshold,*

*means for comparing a predetermined threshold value for the received signal strength input to a preset value; and*

*means for either determining timing of a hand-off from the measurement of signal quality if the threshold value is below the preset value, or else determining timing of a hand-off from the received signal strength input if the threshold value is above the preset value.*

*63. Apparatus for use in a small-cell mobile radio communication system for determining an optimal timing of a hand-off of a call-in-progress, said apparatus comprising;*

*means for receiving a high-frequency signal;*

*first means responsive to said high frequency signal for generating a measurement of signal quality;*

*second means responsive to said high-frequency signal for generating a received signal strength magnitude; and*

*a control means responsive to said measurement of signal quality and said received signal strength magnitude for generating a hand-off signal if said received signal strength magnitude is below a first threshold and said measurement of signal quality is below a second threshold and for generating a hand-off signal if said received signal strength magnitude is at least equal to said first threshold and below a third threshold.*

*64. Apparatus for use in a small-cell mobile radio communication system for determining an optimal timing of a hand-off of a call-in-progress, said apparatus comprising:*

*means for receiving a high-frequency signal;*

*first means responsive to said high frequency signal for generating a measurement of signal quality;*

*second means responsive to said high-frequency signal for generating a received signal strength magnitude; and*

*a control means responsive to said measurement of signal quality and said received signal strength magnitude for generating a hand-off signal if said received signal strength magnitude is below a first threshold and said measurement of signal quality is below a second threshold and for generating a hand-off signal if said received signal strength magnitude is at least equal to said first threshold and below a third threshold,*

*means for measuring said high-frequency signal for a first predetermined time interval;*

*means for evaluating a percentage of said first predetermined time interval during which said measurement of signal quality is below said second threshold; and*

*means for determining that said call-in-progress should be handed off when said percentage determined by said evaluating means at least equals a second ideal value.*

*65. Apparatus for use in a small-cell mobile radio communication system for determining an optimal timing of a hand-off of a call-in-progress, said apparatus comprising:*

*means for receiving a high-frequency signal;*

*first means responsive to said high-frequency signal for generating a measurement of signal quality;*

*second means responsive to said high-frequency signal for generating a received signal strength magnitude;*

*a control means responsive to said measurement of signal quality and said received signal strength magnitude for generating a hand-off signal upon the first occurrence of said received signal strength magnitude exceeding a first threshold and said measurement of signal quality exceeding a second threshold;*

*means for comparing a predetermined threshold value for the received signal strength input to a preset value; and*

*means for determining timing of a hand-off from the measurement of signal quality if the threshold value is below the preset value, or else determining timing of a hand-off from the received signal strength input if the threshold value is above the preset value.*

*66. Apparatus for use in a small-cell mobile radio communication system for determining an optimal timing of a hand-off of a call-in-progress, said apparatus comprising:*

*means for receiving a high-frequency signal;*

*first means responsive to said high-frequency signal for generating a measurement of signal quality;*

*second means responsive to said high-frequency signal for generating a received signal strength magnitude;*

*a control means responsive to said measurement of signal quality and said received signal strength magnitude for generating a hand-off signal upon the first occurrence of said received signal strength magnitude exceeding a first threshold and said measurement of signal quality exceeding a second threshold,*

*means for measuring a time interval of predetermined duration; and*

*means for determining a first percentage of said time interval during which said measurement of signal quality is less than said second threshold and a second percentage of said time interval during which said receive signal strength magnitude is less than a third threshold.*

*67. Apparatus for use in a small-cell mobile radio communication system for determining an optimal timing of a hand-off of a call-in-progress, said apparatus comprising:*

*means for receiving a high-frequency signal;*

*first means responsive to said high-frequency signal for generating a measurement of signal quality;*

*second means responsive to said high-frequency signal for generating a received signal strength magnitude;*

*a control means responsive to said measurement of signal quality and said received signal strength magnitude for generating a hand-off signal upon the first occurrence of said received signal strength magnitude exceeding a first threshold and said measurement of signal quality exceeding a second threshold;*

*means for measuring said high-frequency signal for a first predetermined time interval;*

*means for evaluating a percentage of said first predetermined time interval during which said measurement of signal quality is below said second threshold; and*

*means for determining that said call-in-progress should be handed off when said percentage determined by said evaluating means at least equals a second ideal value.*

*68. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A;*

*C. determining that said call-in-progress should be handed off when said measurement of quality at least equals a first threshold value and said received signal strength magnitude is less than a second threshold;*

*D. measuring said signal for a first predetermined time interval;*

*E. evaluating a percentage of said first predetermined time interval during which said measurement of signal quality is below a third threshold; and*

*F. determining that said call-in-progress should be handed off when said percentage determined in step E at least equals a second ideal value.*

*69. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C1a. measuring said signal for a first predetermined time interval;*

*C1b. evaluating a percentage of said first predetermined time interval during which said received signal strength magnitude is below a second threshold; and*

*C1c. determining that said call-in-progress should be handed off when said percentage determined in step C1b at least equals a first ideal value.*

*70. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the step of:*

*A. generating a measurement of signal quality from said signal;*

*B. measuring a received signal strength magnitude of said signal simultaneously with, and independently of, step A;*

*C2a. measuring signal for a first predetermined time interval;*

*C2b. evaluating a percentage of said first predetermined time interval during which said measurement of signal quality is below a threshold; and*

*C2c. determining that said call-in-progress should be handed off when said percentage determined in step C2b at least equals a first ideal value.*

*71. In a cellular mobile radio communication system having a plurality of fixed stations and at least one mobile station transmitting a signal to one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A;*

*C. determining that said call-in-progress should be handed off when said measurement of signal quality at least equals a first threshold value and said received signal strength magnitude is less than a second threshold; and*

*D. determining that said call-in-progress should be handed off when said received signal strength magnitude is below said first threshold and said measurement of signal quality is less than a third threshold, wherein step C includes the steps of:*

*C1. measuring said signal for a second predetermined time interval;*

*C2. evaluating a percentage of said second predetermined time interval during which received signal strength magnitude is below a second threshold; and*

*C3. determining that said call-in-progress should be handed off when said percentage determined in step C2 at least equals a first ideal value.*

*72. A method for a hand-off of a call-in-progress in a small-cell mobile radio communication system,*

*including the steps of:*

*receiving a signal;*

*detecting both a signal quality and a received signal strength input from the signal simultaneously with and independently of each other;*

*determining timing of a hand-off from the detected signal quality upon the occurrence of a first condition and the detected received signal strength input upon the occurrence of a second condition; and*

*sending out a hand-off signal at the determined time of a hand-off.*

*73. In a cellular mobile radio communication system having a plurality of fixed stations and at least one mobile station communicating a signal with one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A;*

*C. determining that said call-in-progress should be handed off when a predetermined threshold value for the received signal strength input at least equals a first threshold value and said received signal strength magnitude is less than a second threshold; and*

*D. determining that said call-in-progress should be handed off when a predetermined threshold value is below said first threshold and said measurement of signal quality is less than a third threshold.*

*74. In a cellular mobile radio communication system having a plurality of fixed stations and at least one mobile station communicating a signal with one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. determining that said call-in-progress should be handed off from the first occurrence of one of the following conditions (a) the detected received signal strength input matching or exceeding a first predetermined value and (b) the detected signal quality matching or exceeding a second predetermined value.*

*75. A method according to claim 74, further comprising the step of:*

*converting the signal received from said mobile station into an intermediate-frequency signal.*

*76. A method according to claim 74, wherein said detecting step includes the step of:*

*measuring said signal for a first predetermined time interval.*

*77. Apparatus for use in a small-cell mobile radio communication system for determining optimal timing of a hand-off of a call-in-progress, said apparatus comprising:*

*transceiver for communicating a signal;*

*means for detecting both a signal quality and a received signal strength input from the signal simultaneously with and independently of each other;*

*means for determining timing of a hand-off from the detected signal quality and received signal strength input on a predetermined condition;*

*means for sending out a hand-off signal at the determined time of a hand-off, and*

*wherein the timing of a hand-off is determined by the first occurrence of one of the following conditions (a) the detected received signal strength input matching or exceeding a first predetermined value and (b) the detected signal quality matching or exceeding a second predetermined value.*

*78. In a cellular mobile radio communication system having a plurality of fixed stations and at least one mobile station communicating a signal with one of said plurality of fixed stations, a method for determining when a call-in-progress should be handed off from said one fixed station to another fixed station, said method including the steps of:*

*A. generating a measurement of signal quality from said signal;*

*B. measuring a received signal strength magnitude of said signal simultaneously with, and independently of, step A; and*

*C. determining that said call-in-progress should be handed off from said generated measurement of signal quality upon the occurrence of a first condition and from the detected received signal strength input upon the occurrence of a second condition.*

*79. In a cellular mobile radio communication system having a plurality of fixed stations and at least one mobile station communicating a signal with one of said plurality of fixed stations, a method for determining when a call-in-progress should be handed off from said one fixed station to another station, said method including the steps of:*

*A. generating a measurement of signal quality from said signal;*

*B. measuring a received signal strength magnitude of said signal simultaneously with, and independently of, step A;*

*C. determining that said call-in-progress should be handed off from said generated measurement of signal quality upon the occurrence of a first condition and from the detected received signal strength input upon the occurrence of a second condition; and*

*D. converting the signal received from said mobile station into an intermediate-frequency signal.*

* * * * *